US011662618B2

(12) United States Patent
Kawamura et al.

(10) Patent No.: US 11,662,618 B2
(45) Date of Patent: May 30, 2023

(54) COUNTER SUBSTRATE FOR A LIQUID CRYSTAL DISPLAY DEVICE COMPRISING FIRST AND SECOND LIGHT SHIELDING LAYERS THAT ARE LAYERED WHILE CONTACTING EACH OTHER AT A CROSSING PART

(71) Applicant: Japan Display Inc., Tokyo (JP)

(72) Inventors: Toru Kawamura, Tokyo (JP); Seiji Uejima, Tokyo (JP); Koichiro Adachi, Tokyo (JP); Tetsuya Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/412,481

(22) Filed: Aug. 26, 2021

(65) Prior Publication Data

US 2021/0382347 A1 Dec. 9, 2021

Related U.S. Application Data

(63) Continuation of application No. 16/255,337, filed on Jan. 23, 2019, now Pat. No. 11,106,073.

(30) Foreign Application Priority Data

Jan. 23, 2018 (JP) .............................. JP2018-009097

(51) Int. Cl.
*G02F 1/1335* (2006.01)
*G02F 1/1362* (2006.01)
(Continued)

(52) U.S. Cl.
CPC ...... *G02F 1/133512* (2013.01); *G02F 1/1343* (2013.01); *G02F 1/1351* (2021.01);
(Continued)

(58) Field of Classification Search
CPC ............ G02F 1/136218; G02F 1/1351; G02F 2201/08; G02F 1/1352
See application file for complete search history.

(56) References Cited

U.S. PATENT DOCUMENTS

2013/0342795 A1  12/2013  Park et al.
2014/0036210 A1  2/2014  Nakamura
(Continued)

FOREIGN PATENT DOCUMENTS

JP  2009-210967  9/2009
JP  2017-003650  1/2017
(Continued)

OTHER PUBLICATIONS

Japanese Office Action dated Oct. 12, 2021 in corresponding Japanese Application No. 2018-009097.
(Continued)

*Primary Examiner* — Paul C Lee
(74) *Attorney, Agent, or Firm* — K&L Gates LLP (57) ABSTRACT

A counter substrate for a liquid crystal device is provided and includes an insulating substrate having a first surface and a second surface facing to the first surface, a first light shielding layer extending in a first direction and a second light shielding layer extending in a second direction crossing the first direction at the first surface side, wherein the first light shielding layer and the second light shielding layer are layered while contacting each other at a crossing part, the first light shielding layer contacts the first surface, and the second light shielding layer contacts the first surface in the part other than the crossing part.

8 Claims, 12 Drawing Sheets

(51) Int. Cl.
    *G02F 1/1343* (2006.01)
    *G02F 1/135* (2006.01)
(52) U.S. Cl.
    CPC .. *G02F 1/133514* (2013.01); *G02F 1/136209* (2013.01); *G02F 1/136218* (2021.01); *G02F 1/136286* (2013.01); *G02F 1/1352* (2021.01); *G02F 2201/08* (2013.01)

(56) References Cited

U.S. PATENT DOCUMENTS

2015/0062457 A1  3/2015  Kida et al.
2015/0286097 A1  10/2015 Lee et al.
2017/0038637 A1  2/2017  Takeda et al.

FOREIGN PATENT DOCUMENTS

| JP | 2017003650 | A | * | 1/2017 | |
|----|------------|---|---|--------|--|
| JP | 2017-032812 | A |   | 2/2017 | |
| JP | 2017032812 | A | * | 2/2017 | ............. G02B 5/201 |
| JP | 2017198729 | A | * | 11/2017 | ......... G02F 1/13338 |
| WO | 2010137359 | A1 |  | 12/2010 | |

OTHER PUBLICATIONS

Japanese Office Action dated Jan. 22, 2022 in corresponding Japanese Application No. 2018-009097.

\* cited by examiner

COUNTER SUBSTRATE FOR A LIQUID CRYSTAL DISPLAY DEVICE COMPRISING FIRST AND SECOND LIGHT SHIELDING LAYERS THAT ARE LAYERED WHILE CONTACTING EACH OTHER AT A CROSSING PART

CROSS-REFERENCE TO RELATED APPLICATIONS

This application is a continuation of U.S. patent application Ser. No. 16/255,337, filed on Jan. 23, 2019, which application is based upon and claims the benefit of priority from Japanese Patent Application No. 2018-009097, filed Jan. 23, 2018, the entire contents of which are incorporated herein by reference.

FIELD

Embodiments described herein relate generally to a display device and a display device substrate (color filter substrate).

BACKGROUND

In recent years, display devices with higher definition are demanded. Display devices include, for example, a light shielding layer formed in a lattice shape, and openings are formed in the lattice. When definition of the devices is increased, forming a light shielding layer with properly shaped openings is a challenge.

SUMMARY

The present application relates generally to a display device and a display device substrate.

According to one embodiment, a display device including a display function layer between a first substrate and a second substrate which are opposed to each other, wherein the second substrate includes, in a display area in which an image is displayed, a first light shielding layer extending in a first direction and a second light shielding layer extending in a second direction crossing the first direction, and the first light shielding layer and the second light shielding layer are layered while contacting each other at a crossing part.

DETAILED DESCRIPTION

In general, according to one embodiment, a display device comprises a display function layer between a first substrate and a second substrate which are opposed to each other, wherein the second substrate includes, in a display area in which an image is displayed, a first light shielding layer extending in a first direction and a second light shielding layer extending in a second direction crossing the first direction, and the first light shielding layer and the second light shielding layer are layered while contacting each other at a crossing part.

According to another embodiment, a display device comprises a display function layer between a first substrate and a polarizer which are opposed to each other, the display device comprising a first light shielding layer extending in a first direction and a second light shielding layer extending in a second direction crossing the first direction between the display function layer and the polarizer, wherein the first light shielding layer and the second light shielding layer are layered to contact each other at a crossing part.

According to another embodiment, a display device substrate comprises a first light shielding layer extending in a first direction and a second light shielding layer extending in a second direction crossing the first direction, wherein the first light shielding layer and the second light shielding layer are layered at a crossing part.

Hereinafter, embodiments will be explained with reference to accompanying drawings. Note that, the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

In each embodiment, a liquid crystal display device is disclosed as an example of the display device. The liquid crystal display device can be used in various devices such as a virtual reality (VR) viewer, smartphone, tablet terminal, mobile phone, clamshell personal computer, in-car device, and gaming console.

Figure 1:
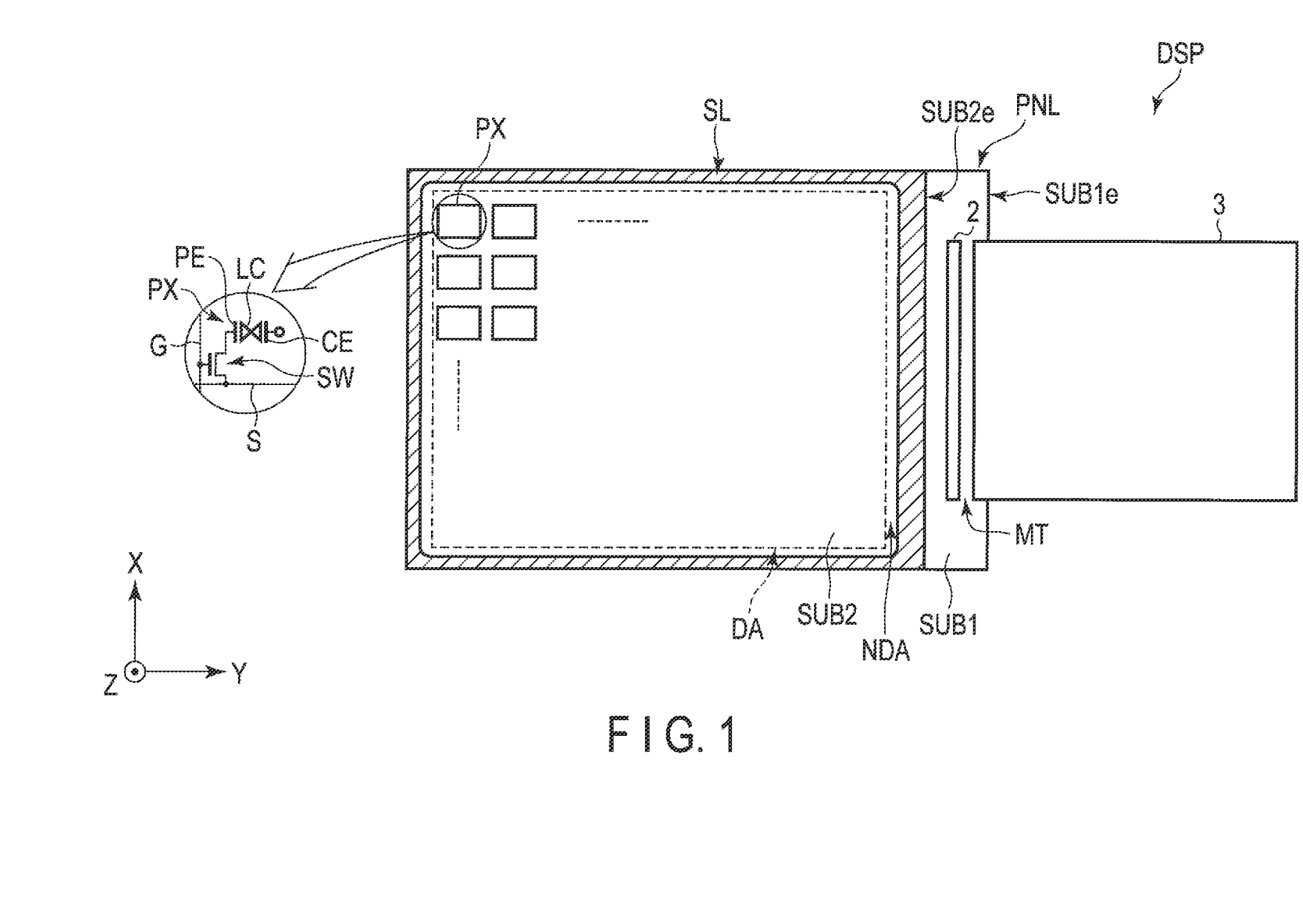
FIG. 1 is a plan view of an example of the structure of a display panel of a display device of an embodiment.

FIG. 1 is a plan view of an example of the structure of a display panel PNL of a display device DSP of the present embodiment. In the figure, a first direction X, second direction Y, and third direction Z are orthogonal to each other; however, they may cross at an angle other than the right angle. Seeing an X-Y plane defined by the first direction X and the second direction Y along the third direction Z will be referred to as plan view. Hereinafter, a direction toward the tip of the arrow of the third direction Z will be defined as up (above), and the opposite direction thereof will be defined as down (below). Furthermore, a length in the third direction Z will be defined as a thickness.

In a plan view, the display panel PNL is formed as, for example, a substantial rectangle. Note that the display panel PNL may be formed as a round shape with round corners. The display panel PNL includes, for example, a first substrate SUB1, second substrate SUB2 opposed to the first substrate SUB1, and display function layer (as described later, liquid crystal layer LC in the present embodiment) held between the first substrate SUB1 and the second substrate SUB2. The first substrate SUB1 and the second substrate SUB2 are adhered by a sealant SL while a certain gap is formed therebetween. The liquid crystal layer LC is filled in a space defined by the first and second substrates SUB1 and SUB2 and the sealant SL. The display panel PNL includes a display area DA inside of which is surrounded by the sealant SL to display an image. The display area DA is, for example, substantially rectangular. Note that the display area DA may be polygonal or round. Furthermore, the display panel PNL includes a non-display area NDA outside the display area DA.

The display panel PNL includes a plurality of sub-pixels PX in the display area DA. A sub-pixel is a minimum unit to be individually controlled by an image signal, and for example, is disposed in an area including a switching element arranged in a position where a gate line and a source line cross, as described later. Furthermore, a main pixel includes a plurality of sub-pixels. For example, one main pixel includes a red sub-pixel, green sub-pixel, and blue sub-pixel. In another example, one main pixel includes a red sub-pixel, green sub-pixel, blue sub-pixel, and white sub-pixel. The main pixel corresponds to a minimum unit of an image displayed in the display area DA. The sub-pixels PX are arranged in a matrix in the display area DA.

The display panel PNL includes, in the display area DA, a gate line G extending in the first direction X, a source line S extending in the second direction Y, a switching element SW electrically connected to the gate line G and the source line S in each sub-pixel PX, a pixel electrode PE electrically connected to the switching element SW in each sub-pixel PX, and a common electrode CE.

The display panel PNL is a transmissive panel which displays an image by selectively transmitting light from a backlight unit disposed in the rear surface thereof. In addition, the display panel may be a reflective panel which displays an image by selectively reflecting external light incident on the display area DA, or a transflective panel which is a combination of the transmissive and reflective panels.

A signal supply source including a driver IC chip 2 and a flexible printed circuit (FPC) 3 which are essential to drive the display panel PNL is positioned in the non-display area NDA. In the example depicted, the driver IC chip 2 and the FPC 3 are mounted in a mount area MT of a first substrate SUB1 extending outward further than one substrate side edge SUB2e of a second substrate SUB2. The mount area MT is formed along a substrate side edge SUB1e of the first substrate SUB1. Although this is not depicted, the first substrate SUB1 includes connection terminals (pads) to connect the signal supply sources to the mount area MT. Some of the pads are electrically connected to the gate line G or the source line S. Note that, in the example depicted, other three substrate side edges of the second substrate SUB2 are opposed to other three substrate side edges of the first substrate SUB1.

The sealant SL is disposed in the non-display area NDA so as to surround the display area DA. In the example depicted, the sealant SL is formed in a rectangular shape.

Figure 2:
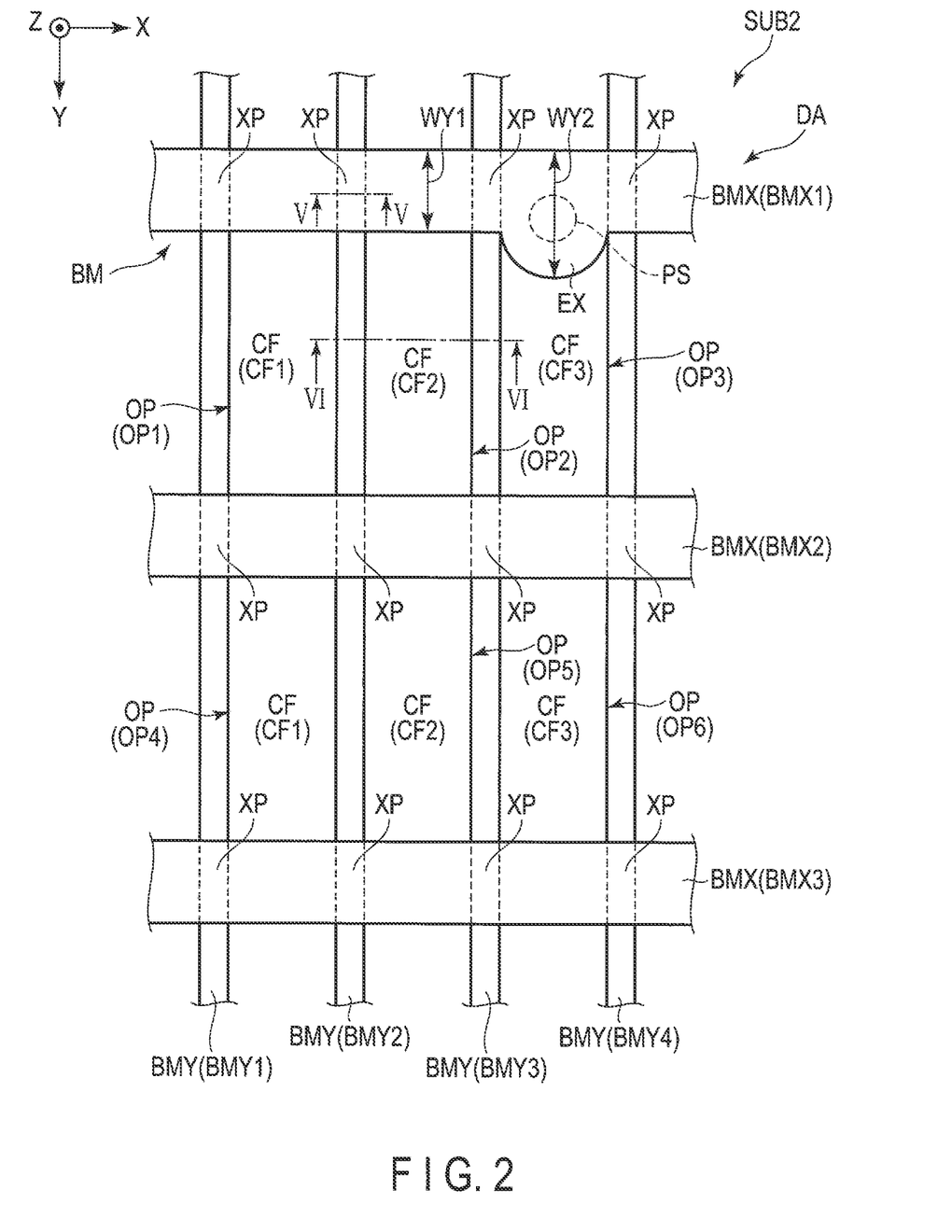
FIG. 2 is a plan view of an example of the structure of a second substrate.

FIG. 2 is a plan view of an example of the structure of the second substrate SUB2. FIG. 2 shows the main parts of the second substrate SUB2.

The second substrate SUB2 includes a light shielding layer BM, color filter CF, and space PS. The light shielding layer BM includes light shielding layers BMX (BMX1, BMX2, BMX3, . . . ) and light shielding layers BMY (BMY1, BMY2, BMY3, BMY4, . . . ). The light shielding layers BMX extend in the first direction X and are arranged in the second direction Y at intervals. Hereinafter, the light shielding layer BMX will be referred to as horizontal light shielding layer BMX for better understanding. In FIG. 2, the horizontal light shielding layers BMX1, BMX2, and BMX3 are arranged, in the display area DA, in the second direction Y at certain intervals. The light shielding layers BMY extend in the second direction Y and are arranged in the first direction X at intervals. Hereinafter, the light shielding layer BMY will be referred to as vertical light shielding layer BMY. In FIG. 2, the vertical light shielding layers BMY1, BMY2, and BMY3 are arranged, in the display area DA, in the first direction X at certain intervals. The horizontal light shielding layer BMX and the vertical light shielding layer BMY cross at a crossing part XP. In the example depicted, the horizontal light shielding layer BMX is layered on the vertical light shielding layer BMY at the crossing part XP. Specifically, at the crossing part XP, the horizontal light shielding layer BMX and the vertical light shielding layer BMY directly contact each other, and no element is interposed therebetween. The horizontal light shielding layer BMX and the vertical light shielding layer BMY are arranged as a lattice. Note that the arrangement of the horizontal light shielding layer BMX and the vertical light shielding layer BMY may be in different. Openings OP (OP1, OP2, OP3, OP4, OP5, OP6, . . . ) are defined by the horizontal light shielding layers BMX and the vertical light shielding layers BMY. In the example depicted, the openings OP are arranged as a matrix on the X-Y plane.

In the example depicted, the horizontal light shielding layer BMX1 includes an extended part EX. The extended part EX has a width WY2 which is greater than a width WY1 of the horizontal light shieling layer BMX1 in the second direction Y. The extended part EX overlaps a spacer PS. The extended part EX is positioned between two vertical light shielding layers BMY3 and BMY4 continuously arranged in the first direction X and extends in a direction toward the tip of the arrow of the second direction Y. Thus, the size of opening OP3 is less than the size of other openings (for example, openings OP1, OP2, OP4, OP5, and OP6). Note that the extended part EX may be positioned in a place other than the gap between the vertical light shielding layers BMY3 and BMY4. For example, the extended part EX may be positioned in a crossing part XP. In addition, the extended part EX may extend in a direction opposite to the direction toward the tip of the arrow of the second direction Y, or may extend in both directions of the second direction Y. There may be a plurality of extended parts EX and spacers PS.

The color filter CF is arranged in the opening OP. The color filter CF includes a color filter CF1 of a first color, color filter CF2 of a second color, and color filter CF3 of a third color. The first, second, and third colors are different from each other. For example, the color filter CF1 is red, color filter CF2 is green, and color filter CF3 is blue.

In the example depicted, the color filters CF1, CF2, and CF3 are arranged in the first direction X repeatedly in this order. Furthermore, the color filters CF1, CF2, and CF3 are disposed in the second direction Y continuously. That is, the color filters CF1, CF2, and CF3 are laid over the area defined by adjacent vertical light shielding layers BMY and laid over each opening OP and horizontal light shielding layer BMX.

Note that the combination of the color filters CF1 to CF3 is not limited to the above-mentioned example. Furthermore, the color filters CF may include color filters of another color, such as white. In that case, the red, green, blue, and white color filters may be arranged repeatedly in the first direction X. The white color filter may be formed of an undyed resin material.

Figure 3:
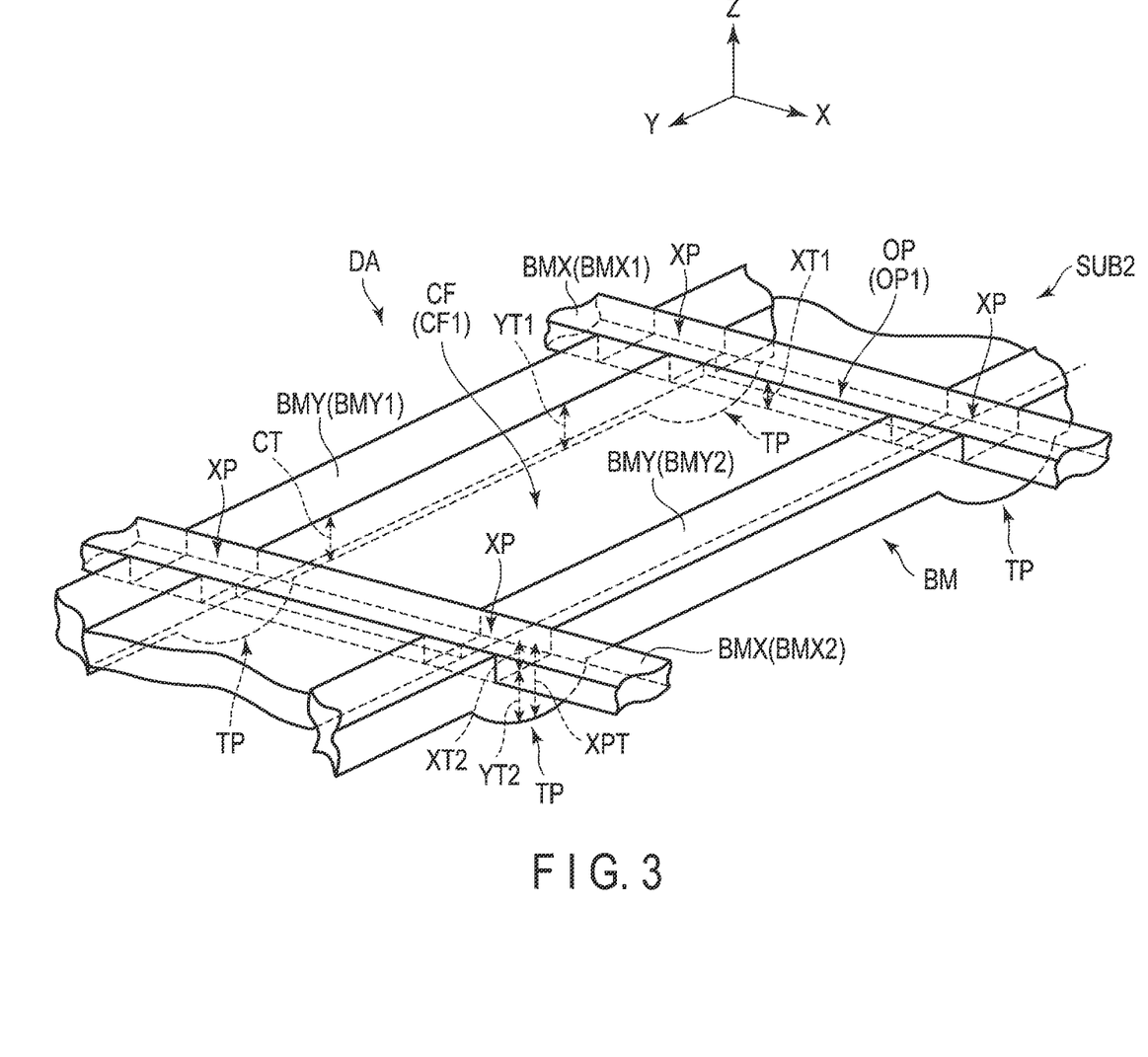
FIG. 3 is a perspective view of an example of a layering condition of a horizontal light shielding layer and a vertical light shielding layer.

FIG. 3 is a perspective view of an example of a layered condition of the horizontal light shielding layer BMX and the vertical light shielding layer BMY.

The horizontal light shielding layer BMX and the vertical light shielding layer BMY are formed in separate processes. In other words, the horizontal light shielding layer BMX is formed in one process, and the vertical light shielding layers BMY is formed in another process. In the example depicted, the vertical light shielding layer BMY is positioned under the horizontal light shielding layer BMX in the crossing part XP and contacts the horizontal light shielding layer BMX in plan view. The vertical light shielding layer BMY includes a projection TP projecting downward at the crossing part XP. Note that the horizontal light shielding layer BMX may be positioned under the vertical light shielding layer BMY at the crossing point XP and contact the vertical light shielding layer BMY. In that case, the horizontal light shielding layer BMX includes a projection projecting downward.

Since being formed in separate processes, the horizontal light shielding layer BMX and the vertical light shielding layer BMY are each formed of unique material, thickness, and the like. In the example depicted, the vertical light shielding layer BMY has a thickness YT1 in the part other than the crossing part XP, and the thickness YT1 is greater than a thickness XT1 of the horizontal light shielding layer BMX in the part other than the crossing part XP. In other words, the thickness XT1 is less than the thickness YT1 in the part other than the crossing part XP. Note that the thickness YT1 may be formed to be equal to or less than the thickness XT1. A thickness XPT of the light shielding layer BM at the crossing part XP corresponds to a sum of a thickness XT2 of the horizontal light shielding layer BMX at the crossing part XP and a thickness YT2 of the vertical light shielding layer BMY at the crossing part XP. The thickness XPT is, for example, less than a sum of the thickness XT1 and the thickness YT1. In other words, a sum of the thickness XT1 and the thickness YT1 is greater than the thickness XPT. In that case, the thickness XT1 may be different from the thickness XT2, or the thickness YT1 may be different from the thickness YT2. Furthermore, the thickness XT1 and the thickness YT1 may be different from the thickness XT2 and the thickness YT2, respectively. Note that the thickness XPT may be equal to the sum of thickness XT1 and thickness YT1, or may be greater than the sum of the thickness XT1 and the thickness YT1. The thickness XT1 may be equal to the thickness XT2 or may be less than the thickness XT2. The thickness YT1 may be equal to the thickness YT2 or may be less than the thickness YT2. In either case, the light shielding layer BM has a thickness XPT at a crossing part XP, and the thickness XPT differs from thicknesses XT1, YT1, and the like of the light shielding layer BM in the part other than the crossing part XP. Furthermore, in the example depicted, a color filter CF has a thickness CT in an opening OP, and the thickness CT is less than the thickness YT1 and is greater the thickness XT1.

Note that the thickness CT may be equal to or greater than the thickness YT1, or may be equal to or less than the thickness XT1.

Figure 4:
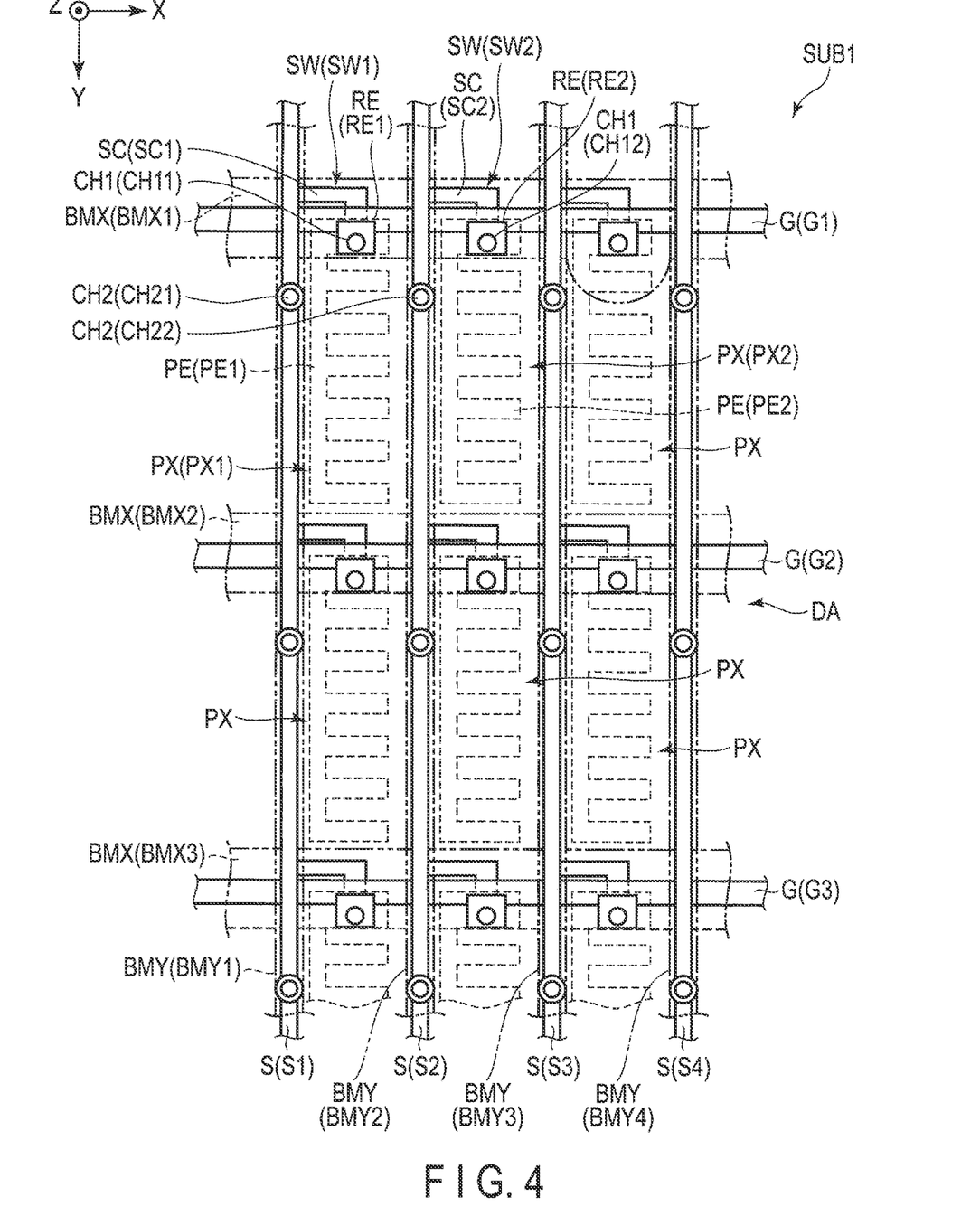
FIG. 4 is a plan view of an example of the structure of a first substrate.

FIG. 4 is a plan view of an example of the structure of the first substrate SUB1. FIG. 4 shows main parts of the first substrate SUB1. In this example, the light shielding layer BX of the second substrate SUB2 of FIG. 2 is depicted in two-dot chain lines.

The first substrate SUB1 includes, for example, gate lines G (G1, G2, G3, . . . ), source lines S (S1, S2, S3, S4, . . . ), switching elements (SW1, SW2, . . . ), relay electrodes RE (RE1, RE2, . . . ), pixel electrodes PE (PE1, PE2, . . . ), and common electrode CE. In FIG. 4, only the elements essential for the description are depicted, and the common electrode CE is omitted from the depiction.

The gate lines G extend in the first direction X and are arranged in the second direction Y at intervals. In FIG. 4, the gate lines G1, G2, and G3 are arranged in the second direction Y at certain intervals. The gate lines G overlap the horizontal light shielding layer BMX. Note that the gate line G may be partly bent. The source lines S extend in the second direction Y and are arranged in the first direction X at intervals. In FIG. 4, the source lines S1, S2, S3, and S4 are arranged in the first direction X at certain intervals. The source lines S overlap the vertical light shielding layer BMY. Note that the source line S may be partly bent. In the example depicted, the gate lines G and the source lines S cross each other to be arranged as a lattice. In the figure, sub-pixels PX (PX1, PX2, . . . ) each correspond to an area defined by two adjacent gate lines G and two adjacent source lines S. For example, the sub-pixel PX1 corresponds to an area defined by the gate lines G1 and G2 and the source lines S1 and S2, and the sub-pixel PX2 corresponds to an area defined by the gate lines G2 and G3 and the source lines S2 and S3.

The pixel electrode PE is disposed in each sub-pixel PX. The pixel electrodes PE are electrically connected to relay electrodes RE (RE1, RE2, . . . ) via contact holes CH1 (CH11, CH12, . . . ). For example, the pixel electrode PE1 is disposed in the sub-pixel PX1. The pixel electrode PE1 is electrically connected to the relay electrode RE1 via a contact hole CH11. The pixel electrode PE is formed of a transparent conductive material such as indium tin oxide (ITO) or indium zinc oxide (IZO). In the example depicted, the pixel electrode PE includes a branch extending in the first direction X from a connection area extending in the second direction. Note that the shape of the pixel electrode PE is not limited to the example depicted, and may be arbitrarily changed to conform to the shape of the sub-pixel PX.

The relay electrode RE is disposed in each sub-pixel PX. The relay electrode RE is electrically connected to the switching element SW. The relay electrode RE is, for example, formed of the material used for the source lines S. For example, the relay electrode RE1 is disposed in the sub-pixel PX1. The relay electrode RE1 is electrically connected to the switching element SW1.

The switching element SW is electrically connected to the source line S via contact hole CH2 (CH21, CH22, . . . ). The switching element SW includes semiconductor layer SC (SC1, SC2, . . . ). In the example depicted, the switching element SW is a double gate type switching element which crosses the gate line G twice. For example, the switching element SW1 is electrically connected to the source line S1 via a contact hole CH11. The switching element SW1 includes a semiconductor layer SC1. The switching element SW1 crosses the gate line G1 twice. Note that the switching element SW may be a single gate type one which crosses the gate line G once.

Figure 5:
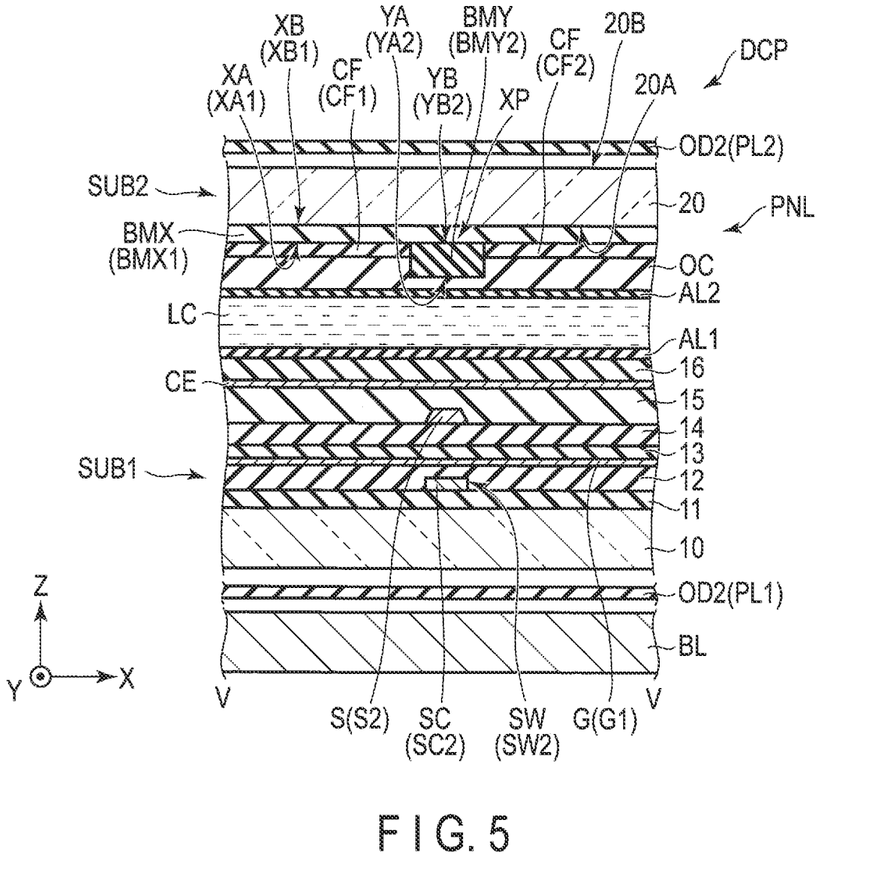
FIG. 5 is a cross-sectional view of the display device, taken along line V-V of FIG. 2.

FIG. 5 is a cross-sectional view of the display device DSP, taken along line V-V of FIG. 2.

The first substrate SUB1 includes, for example, the source line S, gate line G, common electrode CE, switching element SW, first insulating substrate 10, insulating layers 11, 12, 13, 14, 15, and 16, and first alignment film AL1. Note that the first substrate SUB1 is not limited to the depicted example, and may be structured differently.

The first insulating substrate 10 is formed of, for example, a non-alkaline glass or a transparent resin. The insulating layer 11 is positioned above the first insulating substrate 10. The insulating layer 12 is positioned above the insulating layer 11. The semiconductor layer SC (switching element SW) is positioned between the insulating layers 11 and 12 and is opposed to the source line S. The gate line G is positioned above the insulating layer 12. The insulating layer 13 is positioned above the gate line G. The insulating layer 14 is positioned above the insulating layer 13. The insulating layer 15 is positioned above the insulating layer 14. The source line S is positioned between the insulating layers 14 and 15. The common electrode CE is positioned above the insulating layer 15. The common electrode CE is formed of, for example, a transparent conductive material such as ITO or IZO. The insulating layer 16 is positioned above the common electrode CE. The insulating layers 11 to 14 and 16 are, for example, inorganic insulating layers while the insulating layer 15 is, for example, an organic insulating layer. The first alignment film AL1 is positioned above the insulating layer 16.

The second substrate SUB2 includes, for example, a second insulating substrate 20, light shielding layer BM, color filter CF, overcoat layer OC, and second alignment film AL2. Note that the second substrate SUB2 is not limited to the depicted example, and may include other insulating layers or various layers.

The second insulating substrate 20 is formed of, for example, a non-alkaline glass or a transparent resin. The second insulating substrate 20 includes a counter surface 20A which is opposed to the first substrate SUB1 and a rear surface 20B which is an opposite side of the counter surface 20A. In the example depicted, the horizontal light shielding layer BMX contacts the counter surface 20A and is opposed to the gate line G. The horizontal light shielding layer BMX includes a counter surface XA opposed to the first substrate SUB1 and a rear surface XB which is an opposite side of the counter surface XA. Note that various other layers may be positioned between the horizontal light shielding layer BMX and the second insulating substrate 20.

In the example depicted, the vertical light shielding layer BMY contacts the counter surface XA at the crossing part XP. Furthermore, the vertical light shielding layer BMY is opposed to the source line S. The vertical light shielding layer BMY includes a counter surface YA which is opposed to the first substrate SUB1 and a rear surface YB which is an opposite side of the counter surface YA.

In the example depicted, the color filter CF contacts the counter surface XA. The color filter CF contacts the vertical light shielding layer BMY in the first direction X. The color filter CF does not contact the counter surface YA. Note that the color filter CF may contact the counter surface YA.

In the example depicted, the overcoat layer OC covers the under part of the color filter CF. Furthermore, the overcoat layer OC covers a part of the side surfaces of the counter surface YA and the vertical light shielding layer BMY. The second alignment film AL2 is positioned below the overcoat layer OC. Note that the color filter CF between the horizontal light shielding layer BMX and the overcoat layer OC may be omitted. For example, the overcoat layer OC may cover the lower part of the horizontal light shielding layer BMX and the vertical light shielding layer BMY.

A first optical element OD1 including the first polarizer PL1 is positioned between the first insulating substrate 10 and an illumination device BL. A second optical element OD2 including the second polarizer PL2 is positioned above the second insulating substrate 20. The first optical element OD1 and the second optical element OD2 may include a retardation film, if necessary.

Figure 6:
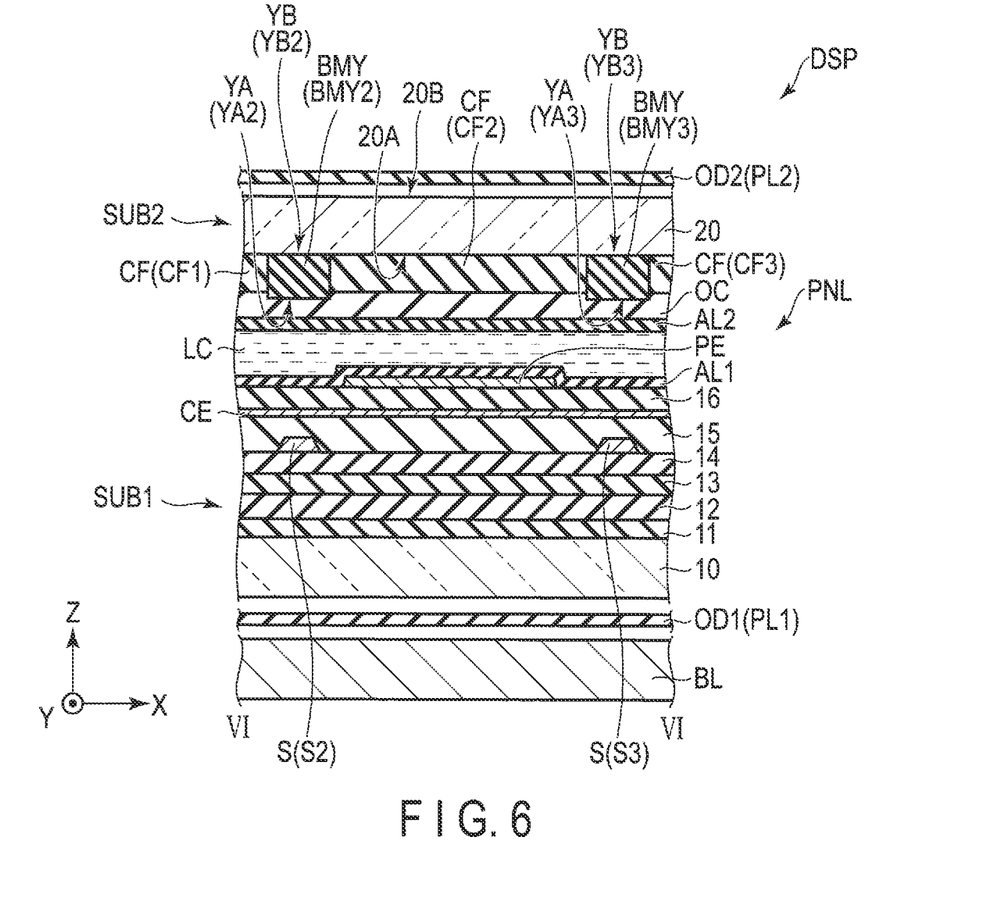
FIG. 6 is a cross-sectional view of the display device, taken along line VI-VI of FIG. 2.

FIG. 6 is a cross-sectional view of the display device DSP, taken along line VI-VI of FIG. 2. FIG. 6 shows an example of the structure of the vertical light shielding layer BMY except for the crossing part XP.

The first substrate SUB1 further includes the pixel electrode PE. In the example depicted, the pixel electrode PE is positioned between the insulating layer 16 and the first alignment film AL1.

In the example depicted, the vertical light shielding layer BMY contacts the counter surface 20A. As shown in FIG. 5, the horizontal light shielding layer BMX entirely contacts the counter surface 20A. On the other hand, the vertical light shielding layer BMY does not contact the counter surface 20A at the crossing part XP. That is, the horizontal light shielding layer BMX and the vertical light shielding layer BMY both contact the counter surface 20A in the part other than the crossing part XP.

In the example depicted, the color filter CF contacts the counter surface 20A. The color filter CF contacts the vertical light shielding layer BMY in the first direction X. The color filter CF does not contact the counter surface YA. Note that the color filter CF may contact the counter surface YA. Note that other various layers may be positioned between the vertical light shielding layer BMY and the color filter CF and the second insulating substrate 20.

In the example depicted, the overcoat layer OC covers the lower part of the color filter CF. Furthermore, the overcoat layer OC covers a part of the side surfaces of the counter surface YA and the vertical light shielding layer BMY.

In the present embodiment, the display device DSP includes the horizontal light shielding layer BMX and the vertical light shielding layer BMY formed separately. Since the horizontal light shielding layer BMX and the vertical light shielding layer BMY are formed separately, they can be arranged optionally and formed in a desired shape. Thus, the display device of the present embodiment can maintain high opening ratio. Therefore, the display device which can properly maintain the shape of the light shielding layer can be presented.

Furthermore, the horizontal light shielding layer BMX and the vertical light shielding layer BMY contact each other at the crossing part XP. That is, even though they are formed separately, a gap and a interposed material can be basically omitted between the horizontal light shielding layer BMX and the vertical light shielding layer BMY, and thus, light leakage can be suppressed. Furthermore, since they are formed separately, the horizontal light shielding layer BMX and the vertical light shielding layer BMY can be formed of different materials and in different thickness, for example. For example, the thickness YT1 of the vertical light shielding layer BMY can be greater than the thickness CT of the color filter CF such that color filters of different colors do not contact each other. Thus, the display device of the present embodiment can improve the display quality.

Now, an example of a manufacturing process of the second substrate SUB2 of the display device DSP will be explained with reference to FIGS. 7 to 11. Note that, in each figure, the second substrate SUB2 is mainly focused and the depiction of the first substrate SUB1 and the like will be omitted.

Figure 7:
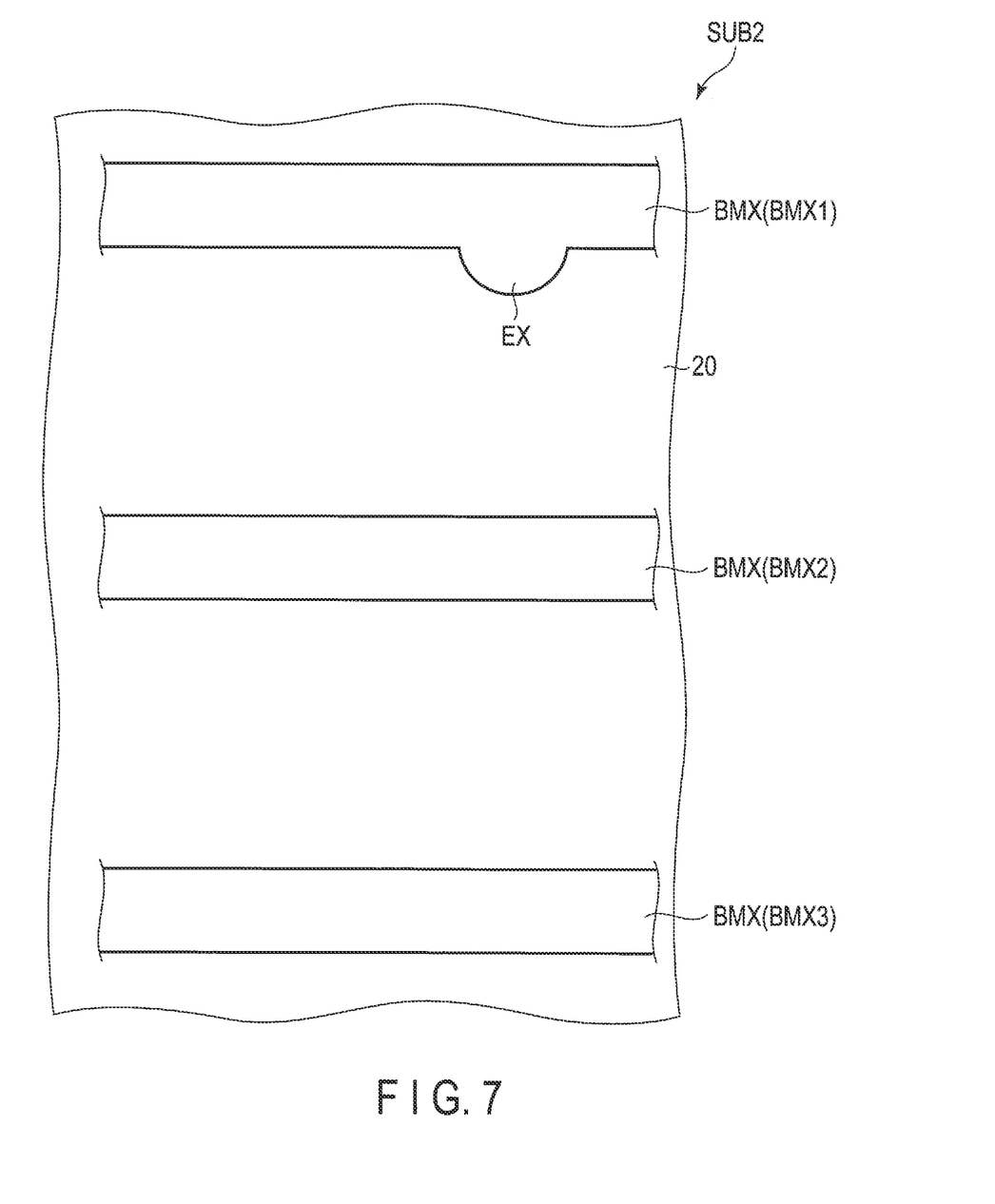
FIG. 7 is a schematic view of an example of a manufacturing process of the second substrate.

Initially, for example, a negative type photoresist (resist) which is cured by light irradiation and undissolved in a developer is applied to the second insulating substrate 20. After the resist is applied to the second insulating substrate 20, the resist is exposed via a photomask including an opening pattern corresponding to the horizontal light shielding layer BMX. After the exposure of the resist, the resist is removed except the pattern of the horizontal light shielding layer BMX and the residing resist (horizontal light shielding layer BMX) is sintered. Through the above process, the horizontal light shielding layer BMX can be formed. In the example depicted, the horizontal light shielding layer BMX1 include an extended part EX. When the horizontal light shielding layer BMX is formed, the thickness XT1 of FIG. 3 is, preferably, formed to be less than the application thickness YT1 of the color filter such that the resist of the color filter can be spread in the forming of the color filter CF. Thus, the color filter is spread over the substrate within a range defined by the vertical light shielding layer BMY. Furthermore, with the color filter formed in the above process, the thickness of the color filter becomes greater in the opening OP than the horizontal light shielding layer BMX in the part other than the crossing part XP. Note that, although the negative type resist is applied to the second insulating substrate 20 in the above example, the horizontal light shielding layer BMX may be formed by applying a positive type resist which is decomposed by light irradiation and is dissolved in a developer to the second insulating substrate 20, and exposing and sintering the resist-applied second insulating substrate 20.

Figure 8:
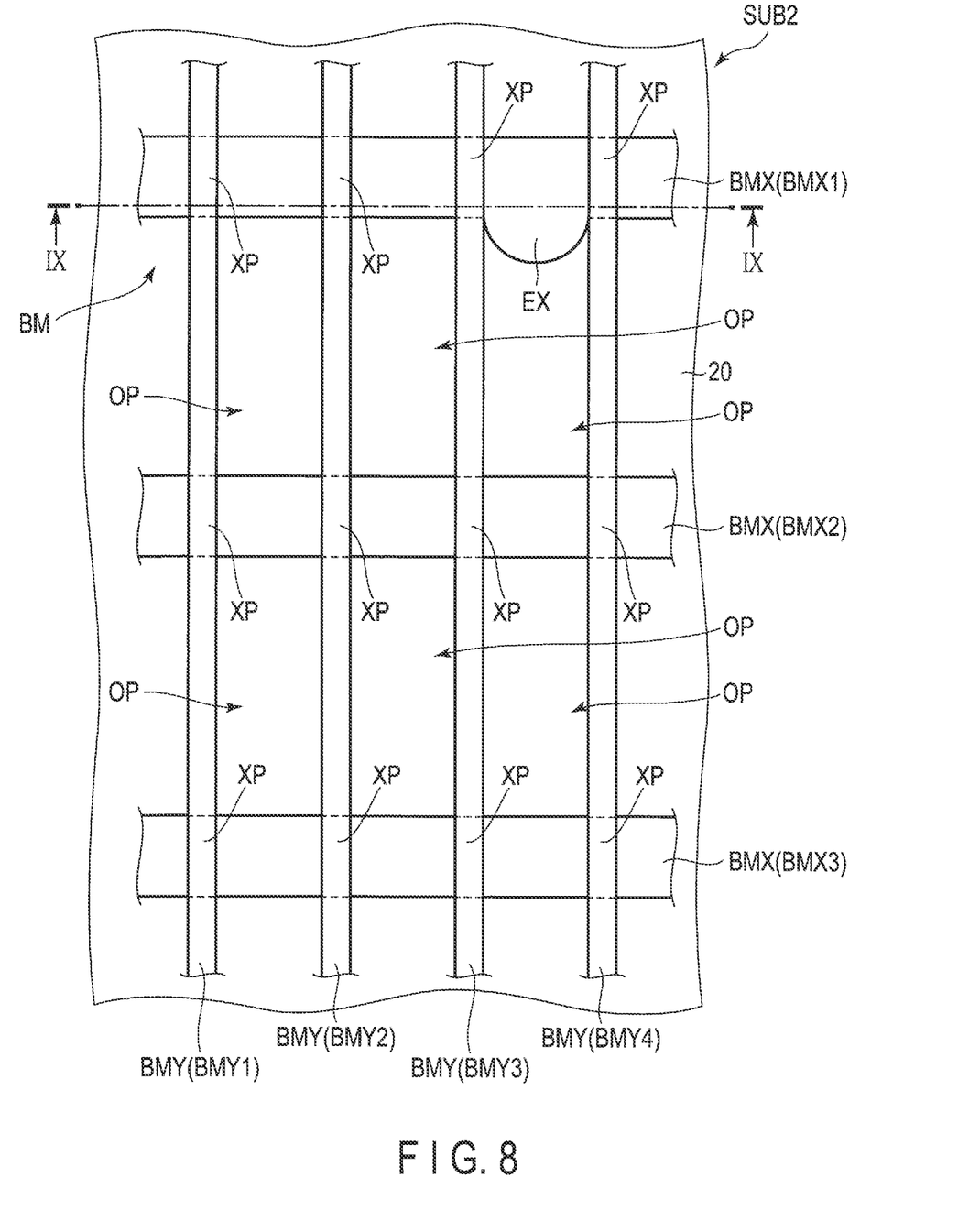
FIG. 8 is a schematic view of an example of the manufacturing process of the second substrate.

Furthermore, for example, a negative type resist is applied to the horizontal light shielding layer BMX and the second insulating substrate 20 of FIG. 7 to cover them. After the application of resist, the resist is exposed via a photomask with an opening pattern corresponding to the pattern of the vertical light shielding layer BMY. After the exposure of the resist, the resist except the pattern of the vertical light shielding layer BMY is removed, and the residing resist (vertical light shielding layer BMY) is sintered. Through the above process, the horizontal light shielding layer BMX and the vertical light shielding layer BMY are formed as shown in FIG. 8. When the vertical light shielding layer BMY is formed, the thickness YT1 is, preferably, formed to be equal to or greater than the thickness CT to isolate the resists of color filters of different colors. In the process shown in FIG. 8, the resist is entirely flattened in the application thereof. That is, the height of the applied film from the second insulating substrate 20 is evened, and thus, the thickness XPT shown in FIG. 3 may be less than a sum of the thickness XT1 and the thickness YT1. Note that, although the negative type resist is applied to the horizontal light shielding layer BMX and the second insulating substrate 20 in the above example, the vertical light shielding layer BMY may be formed by applying a positive type resist to the horizontal light shielding layer BMX and the second insulating substrate 20, and exposing and sintering the resist-applied horizontal light shielding layer BMX and second insulating substrate 20.

Figure 9:
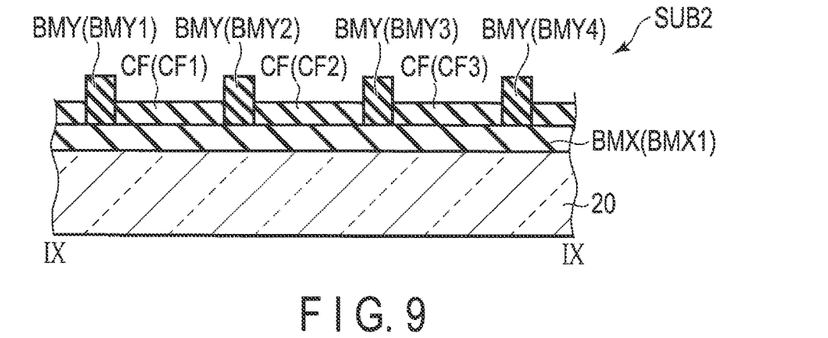
FIG. 9 is a schematic view of an example of the manufacturing process of the second substrate.

FIG. 9 is a cross-sectional view, taken along line IX-IX of FIG. 8. After the vertical light shielding layer BMY is formed as shown in FIG. 8, the color filter CF is formed as shown in FIG. 9. In the example depicted, a resist of the color filter is applied on the horizontal light shielding layer BMX when the color filter CF is formed. Thus, the color filter CF1 is formed between the vertical light shielding layers BMY1 and BMY2. The color filter CF2 is formed between the vertical light shielding layers BMY2 and BMY3. The color filter CF3 is formed between the vertical light shielding layers BMY3 and BMY4. Note that the resist of the color filter CF may not be applied on the horizontal light shielding layer BMX.

Figure 10:
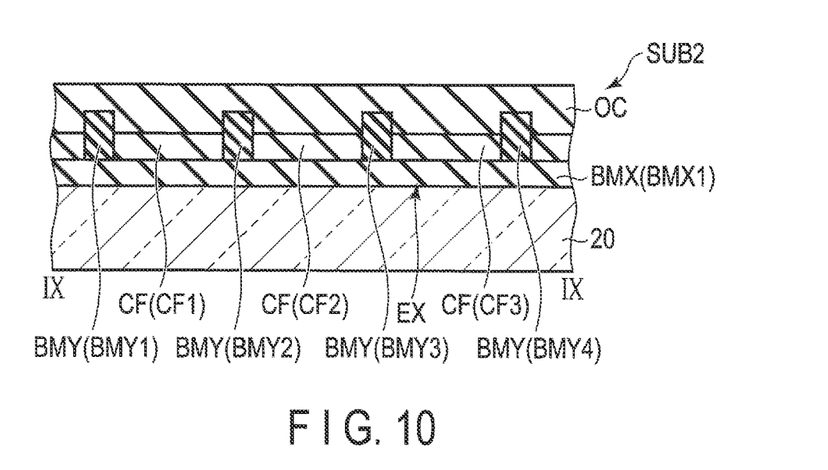
FIG. 10 is a schematic view of an example of the manufacturing process of the second substrate.
Figure 11:
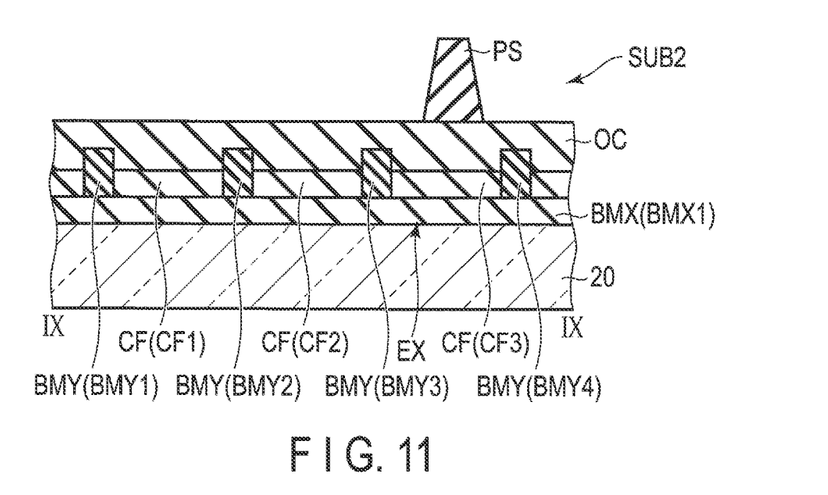
FIG. 11 is a schematic view of an example of the manufacturing process of the second substrate.

Then, the overcoat layer OC is formed as shown in FIG. 10 and the spacer PS is formed as shown in FIG. 11. The spacer PS is formed, for example, between the vertical light shielding layers BMY3 and BMY4 in a position opposed to the extended part EX. After the spacer PS is formed, the overcoat layer OC and the spacer PS are covered with the second alignment film AL2 to form the second substrate SUB2. Then, the first substrate SUB1, liquid crystal layer, and the like are arranged to complete the display device DSP structured as shown in FIG. 1 and the like.

In the above manufacturing process, the horizontal light shielding layer BMX and the vertical light shielding layer BMY are formed through separated exposure step, and thus, the horizontal light shielding layer BMX and the vertical light shielding layer BMY are formed in desired shapes while the influence of optical diffraction and the like is suppressed. Thus, a display device with higher definition and higher aperture ratio can be presented. Furthermore, since the horizontal light shielding layer BMX and the vertical light shielding layer BMY are formed separately, the horizontal light shielding layer BMX and the vertical light shielding layer BMY can be formed with different materials, different thickness, and the like. Furthermore, since the horizontal light shielding layer BMX and the vertical light shielding layer BMY are formed continuously without any interposed layer therebetween, the light shielding layer BM can be formed stably. Thus, the display quality can be improved.

Note that, in the above example the horizontal light shielding layer BMX is formed on the second insulating substrate 20 and then the vertical light shielding layer BMY is formed; however, in another case, the vertical light shielding layer BMY may be formed on the second insulating substrate 20 and then the horizontal light shielding layer BMX.

The display device DSP and the manufacturing method thereof explained above in the above-described embodiment can achieve not only the above-described effects but also various suitable effects.

Now, other examples of the present embodiment will be explained with reference to FIGS. 12 to 14. In the other examples of the present embodiment descried below, elements corresponding to those of the above embodiment will be referred to by the same reference numbers and the description thereof will be omitted in order to focus on the parts different from the above-described embodiment. Note that the effects achieved in the above-described embodiment can be achieved in the other examples as well.

Figure 12:
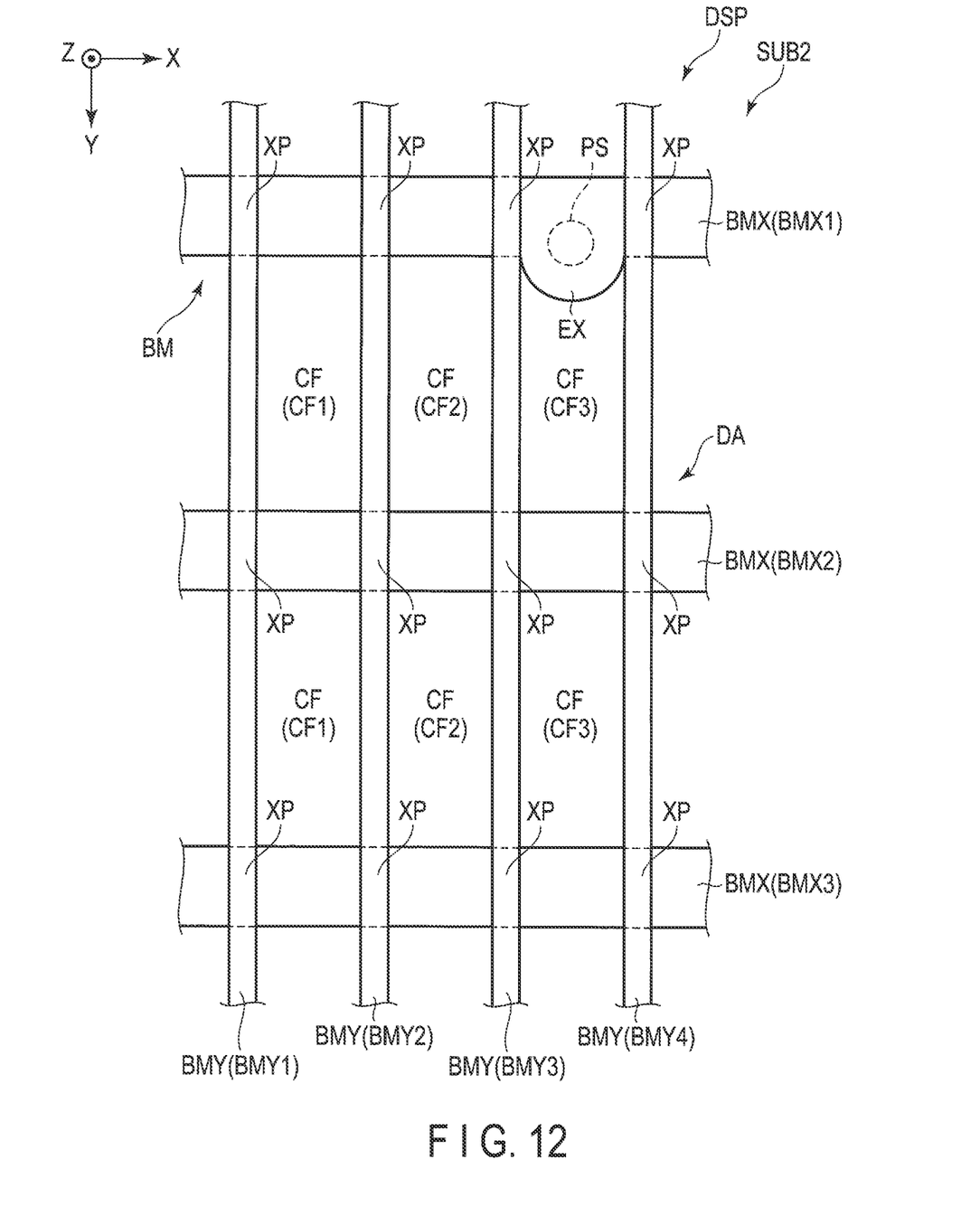
FIG. 12 is a cross-sectional view of another example of a display device of the embodiment.

In the example of FIG. 12, the structure of the light shielding layer BM is different as compared to the model of FIG. 2. In the example depicted, the vertical light shielding layer BMY is layered on the horizontal light shielding layer BMX in plan view. In such a structure, the effects described above can be achieved.

Figure 13:
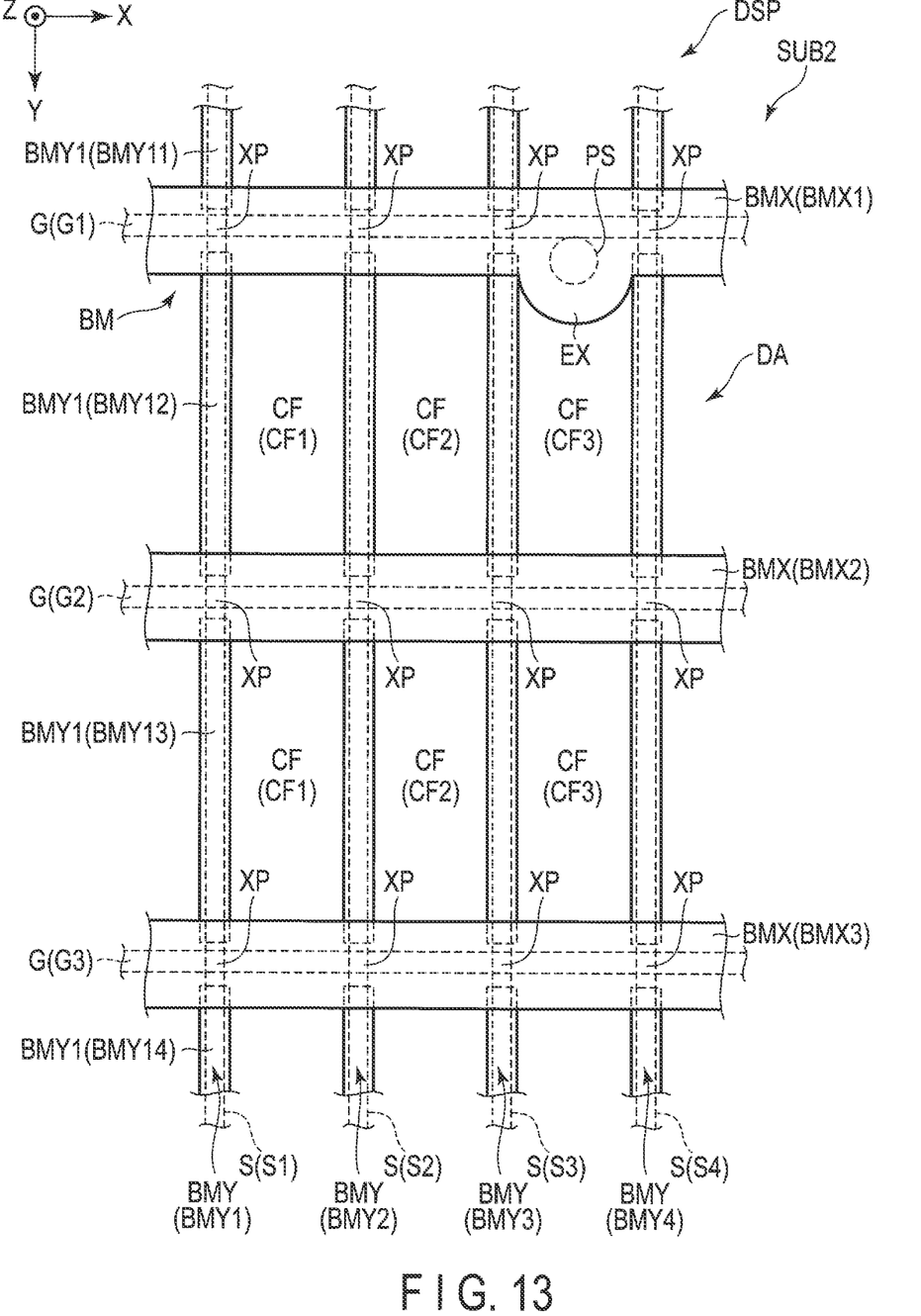
FIG. 13 is a cross-sectional view of another example of the display device of the embodiment.

In the example of FIG. 13, the structure of the light shielding layer BM is different as compared to the model of FIG. 2. FIG. 13 shows the main parts of the first substrate SUB1 in dashed lines.

In the example depicted the vertical light shielding layer BMY is discontinuous at a part overlapping the horizontal light shielding layer BMX. In other words, the vertical light shielding layer BMY is discrete above the position where the source line S crosses the gate line G in plan view. For example, the vertical light shielding layer BMY1 includes partial vertical light shielding layers BMY11, BMY12, BMY13, and BMY14. The partial vertical light shielding layers BMY11, BMY12, BMY13, and BMY14 are arranged in the second direction Y at intervals. One end (lower end) of the partial vertical light shielding layer BMY 11 overlaps the horizontal light shielding layer BMX1 at the crossing part XP. The partial vertical light shielding layer BMY12 is apart from the partial vertical light shielding layer BMY11 in the second direction Y. One end (upper end) of the partial vertical light shielding layer BMY12 overlaps the horizontal light shielding layer BMX1 at the crossing part XP, and the other end (lower end) thereof overlaps the horizontal light shielding layer BMX2 at the crossing part XP. The partial vertical light shielding layers BMY13 and BMY14 have a similar structure.

In such a structure, the effects described above can be achieved.

Note that, for example, the partial vertical light shielding layer may not overlap two horizontal light shielding layers BMX adjacent thereto in the second direction Y. For example, the partial vertical light shielding layer may be positioned between two adjacent horizontal light shielding layers BMX in the second direction Y and may contact these two horizontal light shielding layers BMX. Furthermore, the partial vertical light shielding layer may have a thickness which is equal to or less than the thickness of the horizontal light shielding layer BMX. With such a structure, the display device can be formed thinner.

Figure 14:
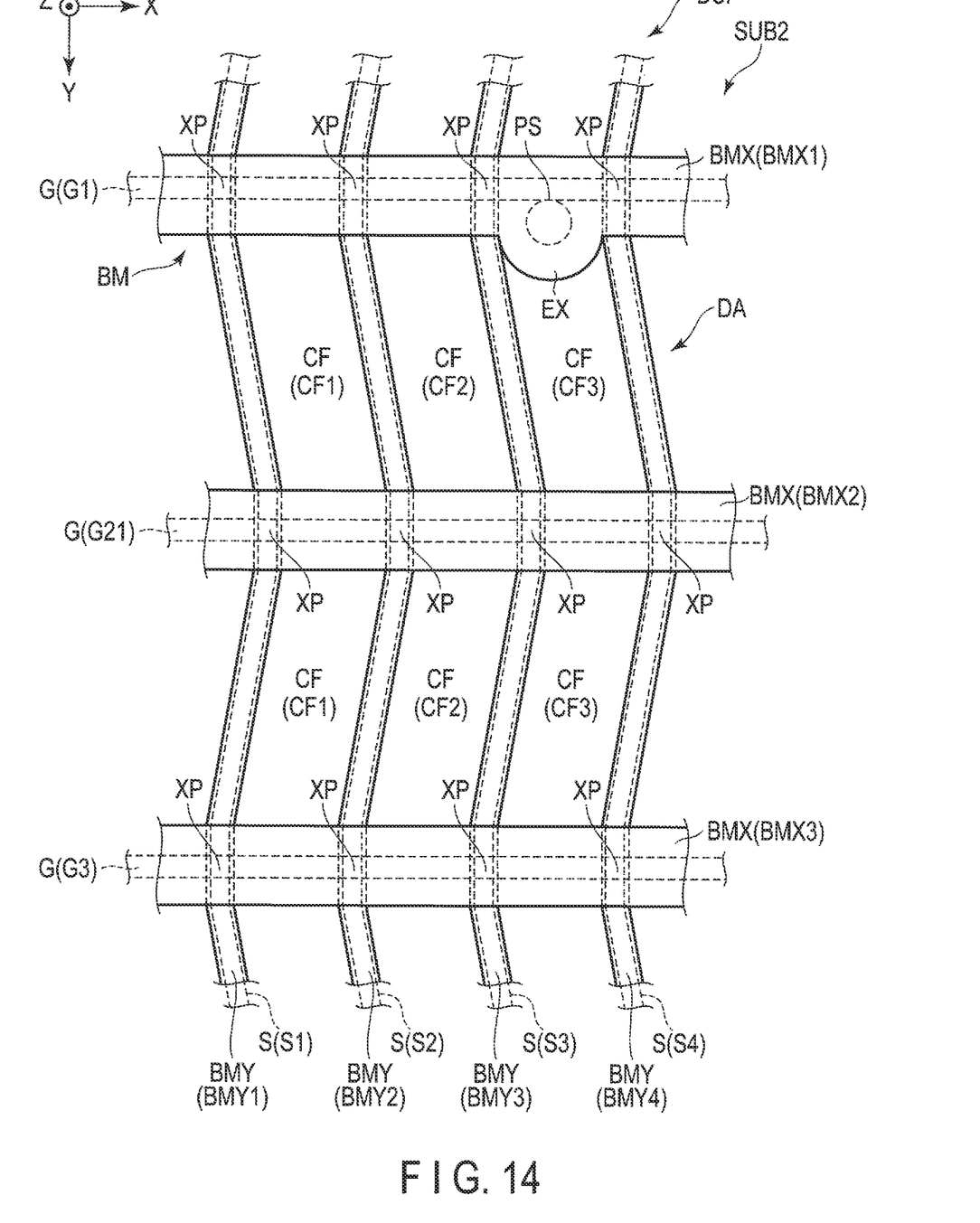
FIG. 14 is a cross-sectional view of another example of the display device of the embodiment.

In the example of FIG. 14, the structure of the light shielding layer BM is different as compared to the example of FIG. 2. FIG. 14 shows the main parts of the first substrate SUB1 with dashed lines.

In the example depicted, the source line S extends in a direction inclined with respect to the gate line G. Between two horizontal light shielding layers BMX adjacent thereto, the vertical light shielding layer BMY extends in a direction inclined with respect to the horizontal light shielding layer BMX as with the source line S. The vertical light shielding layer BMY overlaps the source line S.

In such a structure, the effects described above can be achieved.

The above-described embodiments are merely examples, and the scope of the invention is not limited thereby. For example, the liquid crystal layer may be replaced with a self-luminous layer, and an electrode layer may be disposed between the first substrate and the second substrate or between the first substrate and the polarizer via the self-luminous layer, that is, an organic EL display device may be adopted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A counter substrate for a liquid crystal device comprising:
    an insulating substrate having a first surface and a second surface facing to the first surface,
    a plurality of first light shielding layers extending in a first direction and a plurality of second light shielding layers extending in a second direction crossing the first direction at the first surface side, and
    a plurality of color filters, each of the color filters disposed among the second light shielding layers in the first direction, wherein
    the first light shielding layers and the second light shielding layers are layered while contacting each other at a crossing part,
    the first light shielding layers contacts the first surface,
    each of the second light shielding layers has a front surface which contacts the first surface in the part other than the crossing part and a rear surface which opposites the front surface,
    each of the color filters fills between the second light shielding layers without contacting the rear surface,
    each of the first light shielding layers incudes a second surface contacting the first surface and a third surface facing to the second surface, and
    each of the color filters contacts the third surface.

2. The counter substrate of claim 1, wherein each of the first light shielding layers has a first thickness in the part other than the crossing part, and each of the second light shielding layers has a second thickness in the part other than the crossing part, and
    the first thickness is less than the second thickness.

3. The counter substrate of claim 2, wherein a sum of a third thickness of each of the first shielding layers at the crossing part and a fourth thickness of each of the second light shielding layers at the crossing part is less than a sum of the first thickness and the second thickness.

4. The counter substrate of claim 1, wherein a sum of a first thickness of each of the first light shielding layers in the part other than the crossing part and a second thickness of each of the second light shielding layers in the part other than the crossing part is greater than a sum of a third thickness of each of the first light shielding layers at the crossing part and a fourth thickness of each of the second light shielding layers at the crossing part.

5. The counter substrate of claim 2, wherein
    the second thickness is greater than a fifth thickness of each of the color filters.

6. The counter substrate of claim 1, wherein each of the first light shielding layers or each of the second light shielding layer layers projects in a third direction crossing the first direction and the second direction at the crossing part.

7. The counter substrate of claim 1, wherein part of each of the second light shielding layers is separated in the crossing part.

8. The counter substrate of claim 1, wherein each of the first light shielding layers contacts the first surface in the crossing part, and
    each of the second light shielding layers contacts each of the first light shielding layers in the crossing part.

* * * * *